(12) United States Patent  
Chen

(10) Patent No.: US 7,447,670 B1  
(45) Date of Patent: Nov. 4, 2008

(54) METHODS FOR MONITORING CONFLICTS IN INFERENCE SYSTEMS

(75) Inventor: Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/223,858

(22) Filed: Sep. 8, 2005

(51) Int. Cl.
*G06N 5/00* (2006.01)
(52) U.S. Cl. .......................................... 706/52; 706/45
(58) Field of Classification Search .................. 705/37; 382/103; 706/25, 52, 45
See application file for complete search history.

(56) References Cited

U.S. PATENT DOCUMENTS

| | | | | |
|---|---|---|---|---|
| 5,602,964 | A * | 2/1997 | Barrett | 706/25 |
| 5,963,653 | A * | 10/1999 | McNary et al. | 382/103 |
| 2006/0167784 | A1 * | 7/2006 | Hoffberg | 705/37 |

OTHER PUBLICATIONS

Glenn Shafer, "A Mathematical Theory of Evidence," Princeton University Press, 1976.
Prkash Shenoy, "Using Dempster-Shafer's Belief-Function Theory in Expert Systems," in Advances in the Dempster-Shafer Theory of Evidence, R. Yager, M. Fedrizzi, and J. Kacprzyk, Editors. 1994, John Wiley & Sons, Inc. New York, p. 395-414.

* cited by examiner

*Primary Examiner*—Wilbert L Starks, Jr.
(74) *Attorney, Agent, or Firm*—Tope-McKay & Associates

(57) ABSTRACT

The present invention provides a system and a method to keep track of conflicts resulting from combining basic probability assignments (BPAs) without actually performing the normalization operation at every step of combination. This approach can be applied recursively, allowing the system to keep track of the normalization and conflict of the belief combinations inside a large belief inference system without ever performing a normalization operation as long as the computing system precision allows. The present invention can be applied to monitor conflicts within most inference systems, including the Valuation Based System (VBS) framework for Dempster-Shafer (D-S) evidential reasoning.

38 Claims, 4 Drawing Sheets

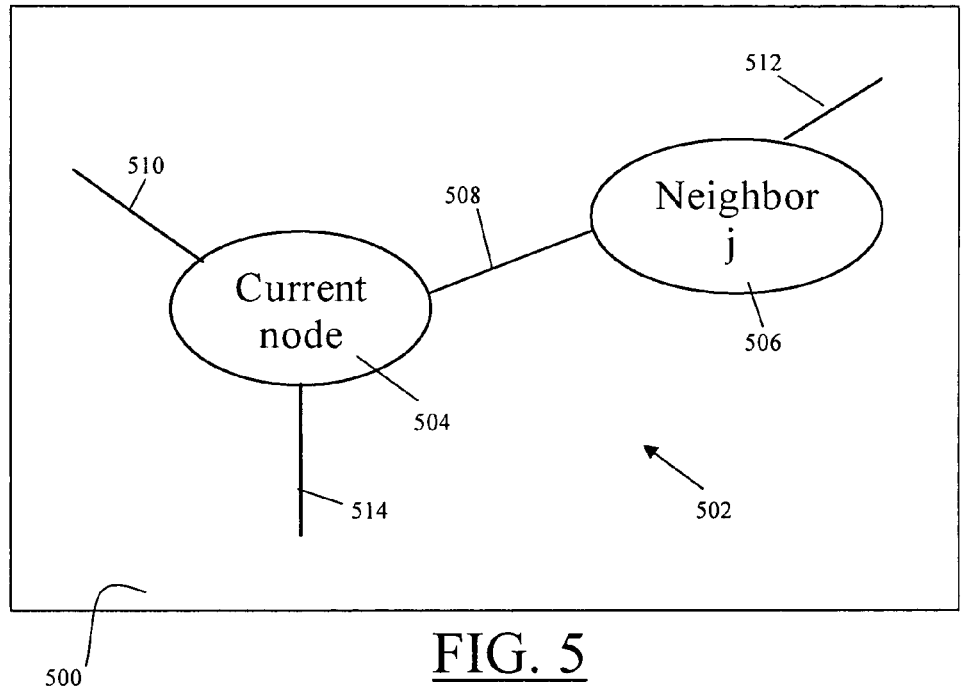
FIG. 5
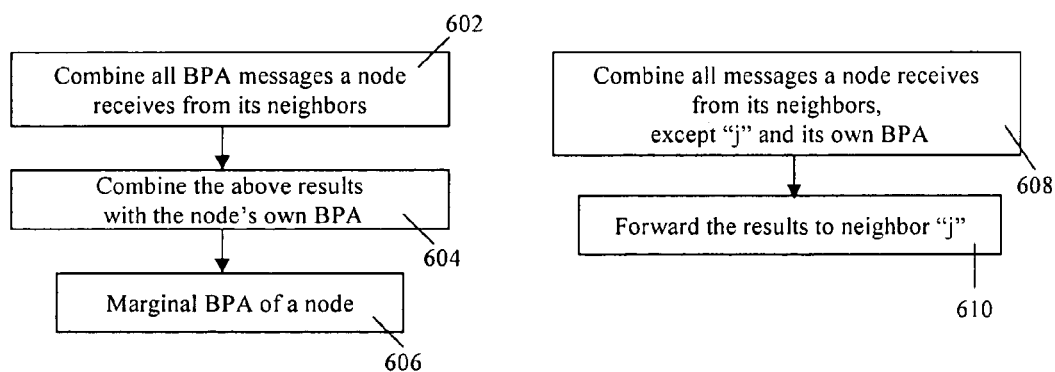
FIG. 6A
FIG. 6B

METHODS FOR MONITORING CONFLICTS IN INFERENCE SYSTEMS

BACKGROUND OF THE INVENTION (1) Field of the Invention

The present invention generally relates to monitoring belief conflicts when belief functions are combined, and more particularly, to conflict monitoring without the need for normalization of the combined beliefs.

(2) Description of Related Art

A system may have multiple information sources that are used to make a decision. The well-known Dempster-Shafer (D-S) theory of evidential reasoning provides a mechanism of combining information from different, and possibly contradictory, information sources to allow a system to make proper decisions. The D-S theory uses explicit representations of ignorance and conflict to avoid the shortcomings of classical Bayesian probability calculus. The D-S theory uses belief functions (also known as basic probability assignments or BPAs), which are generalizations of discrete probability functions used in Bayesian probability calculus. In D-S theory, BPAs represent the distribution of probability mass in a system (i.e., how strongly something is believed, based on the information that has been provided). The Dempster-Shafer theory therefore, is based on obtaining degrees of belief for one question from subjective probabilities for a related question, and uses the Dempster's rule for combining such degrees of belief when they are based on independent items or evidence.

Conflict arises when combined belief functions contradict one another. Conflict monitoring is a basic approach to analyzing the aggregate beliefs of input beliefs in a belief inference system. It allows for a better analysis of beliefs, and improved understanding of the belief inference processes. With today's methods, costly computational operations and methodologies are required to perform conflict monitoring. That is, monitoring must be performed in every operation of a belief inference system to determine conflict. Conflict monitoring involves the performance of normalization, step-by-step, for every combination of belief functions. Normalization is the scaling of combined probabilities in BPA's to add up to one. In general, when probabilities in BPA's are combined, they must add up to one, which is a fundamental definition for the D-S theory. During the process of combining BPA's, the resulting combined BPA numbers may not add up to one because some possibilities may have been eliminated during the process, requiring normalization of the combined BPA's.

Conflict may be defined as the mass assigned to the null set during a combination operation. Conflict C and the normalization factor (k) (included in Shafer's definition of the Dempster's Rule of Combination) have a simple mathematical relationship represented by k=1−C. Normally, belief inference systems using D-S do not need to normalize the combined BPAs during repeated combination operations since the normalization operation can be delayed to when an output is required. Hence, the marginal BPAs of the system for the outputs are normalized only when a marginal BPA is requested. This approach reduces the number of computations that are required in performing the normalization after every combination. However, this prior art approach only reveals the combined total conflict in the combined result and ignores the different types of intermediate conflicts that exist within the intermediate combined BPAs. Therefore, in order to keep track of the "intermediate" conflicts at each combination, today's systems must perform costly normalization computations at every step.

In light of the current state of the art and the drawbacks to current systems and methods mentioned above, a need exists for a method and a system that would allow monitoring of conflicts resulting from combining BPAs without performing the associated costly normalization computations at every step of combination.

BRIEF SUMMARY OF THE INVENTION

The present invention provides a method to keep track of the conflicts resulting from combining BPAs without actually performing the normalization operation at every step of combination. Furthermore, the present invention uses this approach to monitor the conflicts within the Valuation-Based System (VBS) framework for Dempster-Shafer (D-S) evidential reasoning.

The present invention provides a method for computing the normalization factor, and hence the conflict, between two BPAs (normalized or not) without requiring the BPAs to be normalized first. This approach can be applied recursively, allowing the system to keep track of the normalization and conflict of the belief combination inside a large belief inference system such as a VBS system without ever performing a normalization operation, as long as the machine precision allows. Furthermore, the present invention develops formal methods for tracking different types of normalization and conflict factors for belief inference systems based on VBS. While these methods will help in analyzing system behavior and understanding the beliefs observed as input to the system, an objective is to demonstrate a practical method for conflict monitoring without performing normalization with the benefit of reducing computation cost in performing belief inference.

One aspect of the present invention provides both a system and a method for determining valuation-based system characteristics of a physical system represented as a set of basic probability assignments (BPAs), comprising acts, performed on a data processing system, of:

receiving a sequence of normalized basic probability assignments (BPAs) designated $m_i$, for index i=1, ..., n;

having intermediate combined, unnormalized BPAs designated $m'^{(n)}$;

determining a valuation-based system characteristic selected from a group consisting of
  a local cumulative normalization factor,
  a local incremental normalization factor,
  a local cumulative conflict measure,
  a local incremental conflict measure,
  a global cumulative normalization factor,
  a Type I global incremental normalization factor,
  a Type II global incremental normalization factor,
  a global cumulative conflict measure,
  a Type I global incremental conflict measure, and
  a Type II global incremental conflict measure
determined from:

$$k_{12}=k/(k_1 k_2),$$

where
  $k_1$ is a normalization factor for a first BPA $m_1$,
  $k_2$ is a normalization factor for a second BPA $m_2$,
  k is an overall normalization factor, and
  $k_{12}$ represents an incremental normalization factor;

outputting the valuation-based system characteristic;
whereby the valuation-based system characteristic provides information for evaluating the physical system.

Another optional aspect of the present invention provides both a system and a method for determining valuation-based system characteristics of a physical system represented as a set of basic probability assignments (BPAs), comprising acts, performed on a data processing system, where the valuation-based system characteristic determined is a local cumulative normalization factor, determined from:

$$k^{(n)} = \sum_{\forall A \subseteq \Theta} m'^{(n)}(A),$$

where:
- $k^{(n)}$ denotes the local cumulative normalization factor, cumulative to a current BPA $m_n$;
- $m'^{(n)}$ denotes an non-normalized, combined BPA, and is represented by a recursive relation $m'^{(n)} = m'^{(n-1)} \otimes m_n$, having an initial condition $m'^{(0)} = m_0$, where $m_0$ is a normalized BPA initially residing in a node under consideration; and
- A denotes a subset of $\Theta$, where $\Theta$ represents a collection of exclusive and collectively exhaustive outcomes of states of the physical system represented by a node under consideration for the valuation-based system.

Still another optional aspect of the present invention provides both a system and a method for determining valuation-based system characteristics of a physical system represented as a set of basic probability assignments (BPAs), comprising acts, performed on a data processing system, where the valuation-based system characteristic determined is a local incremental normalization factor, determined from:

$$k_n = k^{(n)}/k^{(n-1)},$$

where:
- $k_n$ denotes the local incremental normalization factor;
- $k^{(n)}$ denotes the local cumulative normalization factor, cumulative to a current BPA $m_n$; and
- $k^{(n-1)}$ denotes a local cumulative normalization factor, cumulative to a previous BPA $m_{n-1}$.

Yet another optional aspect of the present invention provides both a system and a method for determining valuation-based system characteristics of a physical system represented as a set of basic probability assignments (BPAs), comprising acts, performed on a data processing system, where the valuation-based system characteristic is a local cumulative conflict measure, determined from:

$$C^{(n)} = 1 - k^{(n)},$$

where:
- $C^{(n)}$ denotes the local cumulative conflict measure, cumulative to a current BPA $m_n$; and
- $k^{(n)}$ denotes the local cumulative normalization factor, cumulative to a current BPA $m_n$.

A further optional aspect of the present invention provides both a system and a method for determining valuation-based system characteristics of a physical system represented as a set of basic probability assignments (BPAs), comprising acts, performed on a data processing system, wherein the valuation-based system characteristic is a local incremental conflict measure, determined from:

$$C_n = 1 - k_n;$$

where:
- $C_n$ denotes the local incremental conflict measure; and
- $k_n$ denotes the local incremental normalization factor.

Still a further optional aspect of the present invention provides both a system and a method for determining valuation-based system characteristics of a physical system represented as a set of basic probability assignments (BPAs), comprising acts, performed on a data processing system, where the valuation-based system is represented by a Markov Tree, and wherein the valuation-based system characteristic is a global cumulative normalization factor, determined from:

$$k_\Sigma = \sum_{\forall A \subseteq \Theta} m'_\Sigma(A);$$

where
- $k_\Sigma$ denotes the global cumulative normalization factor;
- $m'_\Sigma$ denotes an unnormalized, combined BPA, and is equal to $m'^{(n)} \otimes m_\delta$, and $m_\delta$ represents the combination of messages from all neighboring nodes; and
- A denotes a subset of $\Theta$, where $\Theta$ represents a collection of exclusive and collectively exhaustive outcomes of states of the physical system represented by a node under consideration for the valuation-based system.

Another optional aspect of the present invention provides both a system and a method for determining valuation-based system characteristics of a physical system represented as a set of basic probability assignments (BPAs), comprising acts, performed on a data processing system, where the valuation-based system characteristic is a Type I global incremental normalization factor, determined from:

$$k_{I,n} = k_\Sigma/k_{\Sigma-1};$$

where
- $k_{I,n}$ denotes the Type I global incremental normalization factor; and
- $k_\Sigma$ and $k_{\Sigma-1}$ are the global cumulative normalization factors for the current input BPA ($m_n$) and the previous input BPA ($m_{n-1}$).

Yet another optional aspect of the present invention provides both a system and a method for determining valuation-based system characteristics of a physical system represented as a set of basic probability assignments (BPAs), comprising acts, performed on a data processing system, where the valuation-based system characteristic is a Type II global incremental normalization factor, determined from:

$$k_{II,n} = k_\Sigma/(k^{(n)} k_\delta);$$

where
- $k_{II,n}$ denotes the Type II global incremental normalization factor;
- $k_\Sigma$ denotes the global cumulative normalization factors for the current input BPA ($m_n$);
- $k^{(n)}$ denotes the local cumulative normalization factor, cumulative to a current BPA $m_n$; and
- $k_\delta$ denotes the cumulative normalization factor for $m_\delta$, which is the combined BPA of all messages from neighboring nodes.

A further optional aspect of the present invention provides both a system and a method for determining valuation-based system characteristics of a physical system represented as a set of basic probability assignments (BPAs), comprising acts, performed on a data processing system, where the valuation-based system characteristic is a global cumulative conflict measure, determined from the relationship:

$$C_\Sigma = 1 - k_\Sigma;$$

where:
$C_\Sigma$ denotes the global cumulative conflict measure; and
$k_\Sigma$ denotes the global cumulative normalization factor.

Still a further optional aspect of the present invention provides both a system and a method for determining valuation-based system characteristics of a physical system represented as a set of basic probability assignments (BPAs), comprising acts, performed on a data processing system, where the valuation-based system characteristic is a Type I global incremental conflict measure, determined from the relationship:

$$C_{I,n} = 1 - k_{I,n};$$

where
$C_{I,n}$ denotes the Type I global incremental conflict measure; and
$k_{I,n}$ denotes the Type I global incremental normalization factor.

Another optional aspect of the present invention provides both a system and a method for determining valuation-based system characteristics of a physical system represented as a set of basic probability assignments (BPAs), comprising acts, performed on a data processing system, where the valuation-based system characteristic is a Type II global incremental conflict measure, determined from the relationship:

$$C_{II,n} = 1 - k_{II,n};$$

where
$C_{II,n}$ denotes the Type II global incremental conflict measure; and
$k_{II,n}$ denotes the Type II global incremental normalization factor.

Yet another optional aspect of the present invention provides both a system and a method for determining valuation-based system characteristics of a physical system represented as a set of basic probability assignments (BPAs), comprising acts, performed on a data processing system, wherein the valuation-based system characteristic is a local cumulative conflict measure, determined from:

$$C^{(n)} = 1 - k^{(n)},$$

where:
$C^{(n)}$ denotes the local cumulative conflict measure, cumulative to a current BPA $m_n$; and
$k^{(n)}$ denotes the local cumulative normalization factor, cumulative to a current BPA $m_n$.

A further optional aspect of the present invention provides both a system and a method for determining valuation-based system characteristics of a physical system represented as a set of basic probability assignments (BPAs), comprising acts, performed on a data processing system, wherein the valuation-based system characteristic is a local incremental conflict measure, determined from:

$$C_n = 1 - k_n;$$

where:
$C_n$ denotes the local incremental conflict measure; and
$k_n$ denotes the local incremental normalization factor.

Still a further optional aspect of the present invention provides both a system and a method for determining valuation-based system characteristics of a physical system represented as a set of basic probability assignments (BPAs), comprising acts, performed on a data processing system, where the valuation-based system is represented by a Markov Tree, and wherein the valuation-based system characteristic is a global cumulative normalization factor, determined from:

$$k_\Sigma = \sum_{\forall A \subseteq \Theta} m'_\Sigma(A);$$

where
$k_\Sigma$ denotes the global cumulative normalization factor;
$m'_\Sigma$ denotes an non-normalized, combined BPA, and is equal to $m'^{(n)} \otimes m_\delta$, and $m_\delta$ represents a combination of messages from all neighboring nodes; and
A denotes a subset of $\Theta$, where $\Theta$ represents a collection of exclusive and collectively exhaustive outcomes of states of the physical system represented by a node under consideration for the valuation-based system.

Another optional aspect of the present invention provides both a system and a method for determining valuation-based system characteristics of a physical system represented as a set of basic probability assignments (BPAs), comprising acts, performed on a data processing system, where the valuation-based system characteristic is a Type I global incremental normalization factor, determined from:

$$k_{I,n} = k_\Sigma / k_{\Sigma-1};$$

where
$k_{I,n}$ denotes the Type I global incremental normalization factor; and
$k_\Sigma$ and $k_{\Sigma-1}$ are the global cumulative normalization factors for a current BPA ($m_n$) and a previous BPA ($m_{n-1}$).

Yet another optional aspect of the present invention provides both a system and a method for determining valuation-based system characteristics of a physical system represented as a set of basic probability assignments (BPAs), comprising acts, performed on a data processing system, where the valuation-based system characteristic is a Type II global incremental normalization factor, determined from:

$$k_{II,n} = k_\Sigma / (k^{(n)} k_\delta);$$

where
$k_{II,n}$ denotes the Type II global incremental normalization factor;
$k_\Sigma$ denotes the global cumulative normalization factors for the current input BPA ($m_n$);
$k^{(n)}$ denotes the local cumulative normalization factor, cumulative to a current BPA $m_n$; and
$k_\delta$ denotes the cumulative normalization factor for $m_\delta$, which is a combined BPA of all messages from neighboring nodes.

A further optional aspect of the present invention provides both a system and a method for determining valuation-based system characteristics of a physical system represented as a set of basic probability assignments (BPAs), comprising acts, performed on a data processing system, where the valuation-based system characteristic is a global cumulative conflict measure, determined from:

$$C_\Sigma = 1 - k_\Sigma;$$

where:
$C_\Sigma$ denotes the global cumulative conflict measure; and
$k_\Sigma$ denotes the global cumulative normalization factor.

Still a further optional aspect of the present invention provides both a system and a method for determining valuation-based system characteristics of a physical system represented as a set of basic probability assignments (BPAs), comprising acts, performed on a data processing system, where the valuation-based system characteristic is a Type I global incremental conflict measure, determined from:

$$C_{I,n} = 1 - k_{I,n};$$

where
- $C_{I,n}$ denotes the Type I global incremental conflict measure;
- $k_{I,n}$ denotes the Type I global incremental normalization factor.

Another optional aspect of the present invention provides both a system and a method for determining valuation-based system characteristics of a physical system represented as a set of basic probability assignments (BPAs), comprising acts, performed on a data processing system, where the valuation-based system characteristic is a Type II global incremental conflict measure, determined from:

$$C_{II,n} = 1 - k_{II,n};$$

where
- $C_{II,n}$ denotes the Type II global incremental conflict measure; and
- $k_{II,n}$ denotes the Type II global incremental normalization factor.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention.

Referring to the drawings in which like reference character(s) present corresponding parts throughout:

FIG. 5 is an exemplary illustration of a partial structure of a Markov Tree inside the Valuation Based System in accordance with the present invention;

FIGS. 6A and 6B are exemplary flow diagrams representing belief propagation algorithm in a Markov Tree in accordance with the present invention;

DETAILED DESCRIPTION OF THE INVENTION (1) Introduction

Figure 1:
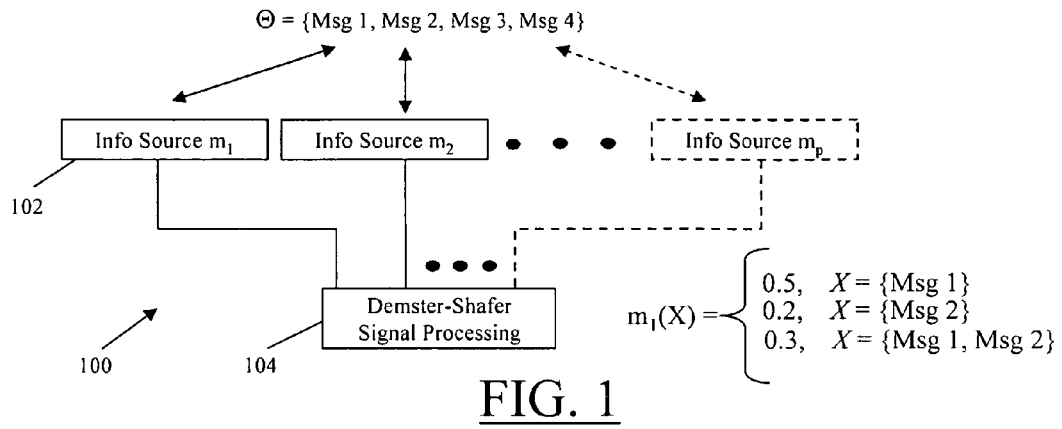
FIG. 1 is an exemplary diagram representing a hardware configuration that may be used with the present invention.
Figure 2:
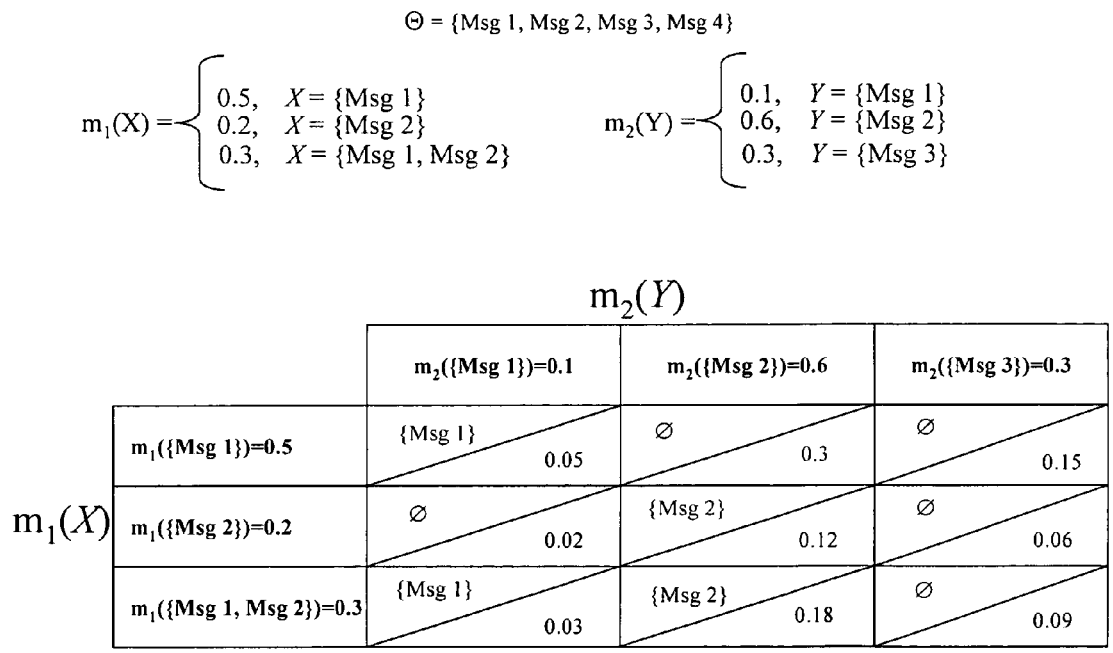
FIG. 2 is an exemplary specific illustration that teaches how the recited Dempster-Shafer (D-S) formulas can be used in accordance with the present invention.

FIGS. 1 and 2 are mere exemplary, specific illustrations that teach how the stated Dempster-Shafer (D-S) formulas can be used, and are therefore exemplary teaching tools only, and should not be limiting. FIG. 1 is an exemplary illustration of an information system 100 that includes a number of information sources 102 and a Dempster-Shafer (D-S) signal processing center 104. The information sources 102 may take a wide variety of forms such as sensors or communication antennas capable of detecting an object, a message, or an event and reporting information to the D-S signal processing center 104. Alternatively, the information sources 102 may be rules or opinions gathered from individuals, typically experts in a particular knowledge domain. The outputs of the information sources 102 may comprise signals, which represent the event (e.g., sensed light, received message, opinion, etc.) being observed. These outputs couple with the signal processing center 104, which generates Basic Probability Assignments or BPA's based on provided information.

In D-S theory evidential reasoning, a common representation of beliefs is in the form of a BPA or Basic Probability Assignment. A BPA is a function defined over a finite set of $\Theta_D$ of exclusive outcomes of certain variables, and assigns numerical values, or mass, to the power set (set of all subsets) of $\Theta_D$:

$$m: 2^{\Theta_D} \rightarrow [0.0, 1.0], \text{ subject to } \sum_{A \subseteq \Theta_D} m(A) = 1.0 \qquad (1)$$

where $\Theta_D$ is a variable frame, defined as a set of exclusive and collectively exhaustive outcomes of variable D;
$2^{\Theta_D}$ represents the power set of $\Theta_D$;
"m" is the BPA function;
"A" represents a subset of $\Theta_D$; and
m(A) represents the mass assigned to "A."

In the D-S system all possible mutually exclusive context facts (or events) of the same kind are enumerated in the "frame of discernment $\Theta$." For example, assuming that the information sources 102 illustrated in FIG. 1 are antennas $m_1$, $m_2$, ... $m_p$ with each antenna "m" distinguished by an index variable sub-"p" that receive messages, their "frame of discernment $\Theta$" may, for example, consist of a set of all possible messages received:

$$\Theta = \{\text{Msg 1, Msg 2, Msg 3, Msg 4}\}.$$

The m: $2^{\Theta_D} \rightarrow [0.0, 1.0]$ in equation (1) defines a mapping of BPA function "m." The mapping is from some set $\Theta_D$ to a real number that is in the range from 0.0 to 1.0, subject to $$\sum_{A \subseteq \Theta_D} m(A) = 1.0.$$

$2^{\Theta_D}$ is a notation representing the power set of $\Theta_D$, which is defined as all possible subsets of set $\Theta_D$. The quantity m(A) is defined as A's basic probability assignment, or BPA, representing the strength of some evidence, which is the exact belief in the proposition represented by "A." A subset "A" for which m(A) is non-zero is called a "focal element" or "focal set". For example, referring to FIG. 1, the exemplary function $m_1(X)$ represents the information from the antenna $m_1$ with assigned masses (beliefs) to each subset A of set $\Theta$ (hence a mapping of subset X to real numbers). The exemplary quantity $m_1(X)$ is defined as X's basic probability number. The assigned masses (or beliefs) to each subset of set $\Theta$ are based on some evidence. In the specific example of FIG. 1, for the function $m_1(X)$ the subset $m_1(\{\text{Msg 1}\})$ of set $\Theta$ is assigned a value (or belief) equaling 0.5 based on some evidence, and the other subsets $m_1(\{\text{Msg 2}\})$ and $m_1(\{\text{Msg 1, Msg 2}\})$, respectively, map to 0.2 and 0.3 by the same antenna $m_1$. When the sum $(\{m_1(\{\text{Msg 1}\})+m_1(\{\text{Msg 2}\})+m_1(\{\text{Msg 1, Msg 2}\})\})$ or 0.3+0.3+0.4) equals to one, it is implied that the function $m_1(X)$ of the set $\Theta$ is a single normalized BPA function because it meets the condition of Eq. (1).

Given two BPA functions, $m_1$ and $m_2$, both defined on $\Theta_D$, the Dempster's Rule of Combination, or D-S combination for short, is defined as:

$$m(A) = \frac{1}{k_{12}} \sum_{X \cap Y = A} m_1(X) m_2(Y), A \subseteq \Theta_D \quad (2)$$

where $k_{12}$ is a normalization constant:

$$k_{12} = \sum_{X \cap Y \neq \emptyset} m_1(X) m_2(Y) \quad (3)$$

where X and Y represent two subsets of $\Theta_D$, and $X \cap Y$ represent their intersection. The $k_{12}$ is simply the sum of non-zero items as a result of D-S combination before applying the normalization. In other words, given different information from two different sources about the same frame of discernment $\Theta_D$, the D-S combination allows for appropriate combination of these two observed events.

The table illustrated in FIG. 2 is a very simple exemplary illustration of the Dempster's Rule of Combination for the information gathered from two exemplary antennas $m_1$ and $m_2$ based on their frame of discernment $\Theta$. This table is use to better illustrate the application of Eqs. (2) and (3). The two exemplary BPA functions $m_1(X)$ and $m_2(Y)$ are defined over the set $\Theta = \{\text{Msg 1, Msg 2, Msg 3, Msg 4}\}$. As illustrated in the row heading $m_1(X)$ of the table, for the function $m_1(X)$ the subset $m_1(\{\text{Msg 1}\})$ of set $\Theta$ is assigned a value (or belief) equaling 0.5, and the other subsets $m_1(\{\text{Msg 2}\})$ and $m_1(\{\text{Msg 1, Msg 2}\})$, respectively, map to 0.2 and 0.3 by the same antenna $m_1$. As to the column heading $m_2(Y)$ of the table, for the function $m_2(Y)$ the subset $m_2(\{\text{Msg 1}\})$ of set $\Theta$ is assigned a value (or belief) equaling 0.1, and the other subsets $m_2(\{\text{Msg 2}\})$ and $m_2(\{\text{Msg 3}\})$, respectively, map to 0.6 and 0.3 by the same antenna $m_2$. All assigned masses are based on some evidence.

The cells within the table show the resulting intersection of the subsets, and the product of the corresponding masses for $m_1(X)$ and $m_2(Y)$. For example, the cell at row 3, column 1 illustrates the intersection of the subset {Msg 1, Msg 2} from $m_1$ with an assigned mass equaling 0.3, with the subset {Msg 1} from $m_2$ with the assigned mass equaling 0.1. In this case, the intersection "{Msg 1, Msg 2}∩{Msg 1}" results in the subset {Msg 1}, and the corresponding product is 0.3×0.1× 0.03. As further illustrated in row 2, column 1 of the table, the subsets {Msg 2} from $m_1$ and {Msg 1} from $m_2$ do not intersect, resulting in a null set ∅ with a product 0.2×0.1=0.02.

As Eq. (2) dictates, the product of all corresponding intersecting subsets that are not the null set ∅ should be summed, and then each of their respective sums is divided by the normalization factor k to determine m(A). In the exemplary instance illustrated in FIG. 2, the products of all corresponding intersecting subsets (e.g., {Msg 1}) throughout the table are summed together, resulting in 0.05+0.03=0.08. The same calculation is performed for the products of all corresponding intersecting subsets (e.g., {Msg 2}) throughout the table, resulting in 0.12+0.18=0.3. As indicated in the table, the remaining subsets are the null sets ∅. Using Eq. (3), the sub-totals of the products for the corresponding intersecting subsets {Msg 1}, 0.08, and for {Msg 2}, 0.3, are then summed to determine the normalization factor, which is $k_{12}$=0.08+ 0.3=0.38. As Eq. (2) further requires, the resulting sum of each individual subset (0.08 for {Msg. 1} and 0.3 for {Msg 2}) is then divided by the normalization factor $k_{12}$=0.38 to determine "m(A)." For this instance, m({Msg 1})=0.08/ 0.38=0.21, and m({Msg 2})=0.3/0.38=0.79.

In the above exemplary case, conflicting inputs (information) may come from two antennas $m_1$ and $m_2$ on the same frame $\Theta$. The quantity $$C_{12} = 1 - k_{12} \quad (4)$$

is called the conflict, since $$C_{12} = \sum_{X \cap Y = \emptyset} m_1(X) m_2(Y). \quad (5)$$

Hence, all intersecting subsets that are indicated as ∅ in the table of FIG. 2, when summed represent the value of the conflict $C_{12}$, (0.02+0.3+0.15+0.06+0.09=0.62) between antennas $m_1$ and $m_2$. It should be noted that according to Eq. (4), as a check to audit the calculations, the sum of all intersections, including the null subsets must equal to 1, as is the case for the values in table of FIG. 2 (0.62+0.38=1).

Eq. (2) can be written in a short form as $$m = m_1 \oplus m_2 \quad (6)$$

with the understanding that $m_1$ and $m_2$ are both normalized (the sum of the mass for all focal elements are 1.0 (Eq. (1)), and m is also normalized as defined by Eq. (2).

In general, $m_1$ and $m_2$ in equation (6) can be non-normalized. When $m_1$ and $m_2$ are non-normalized (with $m'_1$ and $m'_2$ representing their non-normalized versions) Eq. (6) can be rewritten as $$m = (1/k_{12})((1/k_1)m'_1) \otimes ((1/k_2)m'_2), \quad (7)$$

where $\otimes$ represents the non-normalized D-S combination $$m'(A) = \sum_{X \cap Y = A} m'_1(X) m'_2(Y), A \subseteq \Theta_d, \text{ and} \quad (8)$$

$k_1$ and $k_2$ are normalization factors for $m'_1$ and $m'_2$, respectively.

As can be seen from Eq. (7), normalization in D-S combination can be deferred until when a normalized BPA result is needed. This approach can save significant computation when there is a large number of combination operations involved, as the division operation must be carried out on every focal element of the resulting BPA. (Recall that a focal element is a subset $A \subseteq \Theta_D$ such that m(A)≠0.) Normalization can be deferred by simply ignoring it during combination, and computing the non-normalization combination as in Eq. (8), or in its short form:

$$m' = m'_1 \otimes m'_2, \quad (9)$$

where m'=m'(A), is the non-normalized version of the BPA m as defined in Eq. (7), written in short form. Comparing Eq. 7 and Eq. (2), m and m' have the following relationship:

$$m = (1/k) m', \quad (10)$$

where $$k=(k_{12}k_1k_2). \quad (11)$$

Also note that in Eq. (7), the non-normalized BPAs $m'_1$ and $m'_2$ can themselves be the results of combinations of other BPAs. Therefore, the relation shown in Equations (10) and (11) can be applied recursively.

The approach outlined in Eq. (9) and (10) has a drawback. It is difficult to determine which BPA or BPAs contribute to the overall normalization factor k and by how much when more than two BPAs combine, unless the resulting combinations are normalized at every instance when BPAs combine. However, this involves extra calculations, which are costly computational operations. Since the normalization factor is directly related to the conflict measure (Eq. (4)), this problem limits the system's ability to conduct belief conflict analysis. The present invention provides a simple technique to solve this problem, allowing the system to track belief conflict without the requirement of normalization at every step of the combination process. Solving Eq. (11) for $k_{12}$, $$k_{12}=k/(k_1k_2). \quad (12)$$

Hence, if the system keeps track of the normalization factors $k_1$ and $k_2$ for $m'_1$ and $m'_2$, respectively, it can compute $k_{12}$, which would have been the normalization had $m'_1$ and $m'_2$ been normalized, by computing k. In other words, the system is able to calculate the conflict (i.e., $C_{12}=1-k_{12}$) between $m'_1$ and $m'_2$ without first normalizing either BPA. Since the normalization factor k can be computed easily from the combined, non-normalized, BPA by summing over all the mass on focal elements, this approach can potentially eliminate many computations that are otherwise needed for normalizing $m'_1$ and $m'_2$. Therefore, the present invention provides a method and a system to allow monitoring of conflicts resulting from combining BPAs without performing the associated costly normalization computations at every step of combination by providing a method to keep track of the conflicts.

Before providing more details regarding the system and methods of the invention, first a glossary of terms is provided as a reference for the reader. Next, a system overview is provided, describing the interconnection and operation of various major components of a system in accordance with the present invention. After the system overview, a data processing system overview is presented to acquaint the reader with the various components typically found in a data processing system that may be used in conjunction with the present invention, such as the D-S signal processing 104 illustrated in FIG. 1. Next, a discussion section is provided in which the various major components presented in the system overview are discussed in detail. Finally, a results section is provided, which presents non-limiting examples of the operation of the present invention in order to provide a more tangible understanding of the operation of the invention.

(2) Glossary

In order to provide a working frame of reference, a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Further, the definitions provided should not be considered limiting to the extent that the terms are known in the art. These definitions are provided to assist in the understanding of the present invention.

Basic Probability Assignment (BPA)—The BPAs are belief functions that are generalizations of discrete probability functions used in Bayesian probability calculus. The BPAs represent the distribution of probability mass in a system (i.e., how strongly something is believed, based on the information that has been provided).

Belief—Throughout the disclosure the term belief is synonymous with evidence, information, data, etc., often represented as BPAs.

COMBINE operation—A COMBINE operation replaces the original BPA at a system variable with the combination of this BPA and the new input BPA, allowing multiple independent beliefs to be accrued, recursively.

Conflict—Conflict arises when combined belief functions (BPAs) contradict one another. Conflict is defined as the mass assigned to the null set during a combination operation.

Cumulative conflict—Cumulative conflict is defined as the conflict resulting from combining more than two BPAs.

Cumulative normalization factor—Cumulative normalization factor is normalization factor resulting from combining more than two non-normalized BPAs.

Extension operation—An extension operation is one in which a BPA represented on a joint variable frame is represented on a larger joint variable frame by incorporating additional variables.

Focal element—A focal element in a BPA is a subset $A \subseteq \Theta_D$ such that $m(A) \neq 0$.

Global cumulative conflict measure—The global cumulative conflict measure is the cumulative conflict from the combination of all the belief functions in the system, including system's existing input beliefs.

Global cumulative normalization factor—The global cumulative normalization factor is the cumulative normalization factor for the combination of all the belief functions in the system.

Global incremental conflict—The global incremental conflict is the incremental conflict resulting from the introduction of a new BPA into the system.

Incremental conflict—Incremental conflict is defined as the conflict that arises by combining two normalized BPAs.

Incremental normalization factor—Incremental normalization factor is a normalization factor resulting from combining normalized BPAs.

Local cumulative conflict measure—Local cumulative conflict measure is the conflict for a single variable, and is defined as the cumulative conflict of all belief functions (BPAs) received as input directly on the variable of concern, excluding those received from other variable nodes in the Markov Tree. Generally, these beliefs are the result of multiple "COMBINE" commands. Local cumulative conflict reflects the consistency of the evidence received at a specific variable node.

Local cumulative normalization factor—Local cumulative normalization factor is the normalization factor for a single variable, and is defined as the cumulative normalization of all belief functions (BPAs) defined directly on the variable of concern, excluding those received from other variable nodes.

Local incremental conflict measure—Local incremental conflict is defined as the conflict between any belief function (BPA) in a set, and the combined, normalized belief function (BPA) of the remaining belief functions.

Local incremental normalization factor—Local incremental normalization factor is defined as the local incremental normalization between any belief function (BPA) in a set, and the combined, normalized belief function (BPA) of the remaining belief functions.

Marginalization operation—Marginalization operation is an operation in which a BPA represented on a joint variable frame is reduced to a BPA on subset of variable frame by eliminating some of the variables in the original (joint) variable frame.

Normalization—In general, normalization is the scaling of combined mass in BPA's to add up to one. However, one skilled in the art would appreciate that the mass may be scaled to any desired value that is consistently applied, such as for example, 100.

Type I global incremental normalization factor—Type I global incremental normalization factor is the normalization factor considering a new incoming belief combined with the total combined marginal belief of the entire system, as reflected at that variable (or the input node).

Type II global incremental normalization factor—Type II global incremental normalization factor is the normalization factor considering the locally cumulative combined belief at a node, including a new incoming belief combined with the combined belief of the rest of the system, excluding the beliefs at that input node (variable).

SET operation—SET operation is a command of the VBS implementation of the present invention that replaces the initial BPA at a node with a new input BPA.

Valuation Base System (VBS)—A methodology for solving uncertainty reasoning problems using uncertainty calculus, such as D-S belief function.

Variable frame—The variable frame for a variable D is defined as a set of exclusive and collectively exhaustive outcomes of variable D, represented by the symbol $\Theta_D$.

(3) System Overview

When combining BPA functions, a normalization procedure must occur according to D-S combination rule (Eq. 2). The value 1/k, where k is known as the normalization factor, is a way for performing this operation. The difficulty is that the normalization operations are performed at a plurality of nodes at a plurality of levels. Thus, the number of calculations to determine a particular $k_{xy}$ value (incremental normalization factor) becomes large.

The present invention provides a simplified calculation to obtain the cumulative normalization factor k, and given known $k_1$ and $k_2$ values, one may use the methods described below at any point in the system, which may be represented as a Markov Tree, to develop the incremental normalization factor $k_{12}$ without having to start at the bottom of the tree and perform the whole recursive calculation up to the desired point. In other words, the present invention provides a system and a method that enables an easy calculation shortcut for developing incremental and cumulative normalization factors. The present invention further demonstrates the application of the system and the method developed by the present invention in the context of a Markov Tree network structure. The main idea is that the nodes of the Markov Tree represent the BPAs. Two rules for information transfer in the Markov Tree are provided. In addition, two levels of conflict in the tree—at the global and local levels (global meaning over the whole tree and local meaning at a particular variable or node) exist.

Global conflict is the same everywhere—it is "global" in the sense that it is a sum of the conflict over all parts of the network. Global cumulative conflict is the combination of all belief functions over the whole tree. Global incremental conflict results from introducing a new BPA into the overall Markov Tree (similar to a marginal amount of conflict created by adding a new BPA into the overall system). One may basically think of global as being over all the nodes—e.g., global cumulative conflict is the sum of the conflict over all parts (variables) in the network; global incremental conflict is the amount of conflict resulting from the introduction of a change into the network. These are different than the basic D-S definitions, where an incremental conflict is the conflict of combining two normalized BPAs and the cumulative conflict is the conflict from combining more than two BPAs. For a particular variable, the incremental conflict is the conflict between any particular BPA at a node and the combined, normalized, BPA resulting from combining and normalizing the remaining BPAs at that node. The cumulative conflict for a variable is the cumulative conflict of all belief functions defined on a current variable excluding those received from other nodes.

The present invention speeds computation for the determination of the degree of conflict between decision nodes at various levels in a decision network. It provides a fast way to compute the conflict at a given point in the network without having to start at the bottom and perform recursive calculations through a large part of a network, thus making calculations much more conflict.

(4) Data Processing System Overview

Figure 3:
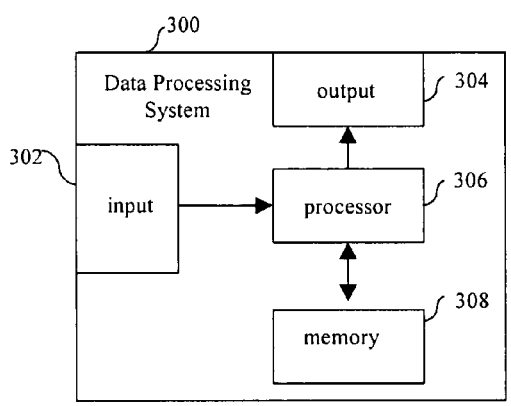
FIG. 3 is an exemplary illustration of a data processing system in accordance with the present invention.
Figure 4:
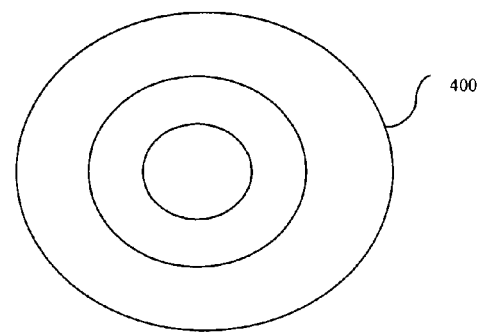
FIG. 4 is an exemplary illustration of a data storage unit (medium) in accordance with the present invention.

A block diagram depicting the components of a computer system that may be used in the present invention is provided in FIG. 3. The data processing system 300 may be construed as a node in a network, a communication unit, or other device such as the D-S signal processing 104 illustrated in FIG. 1 requiring data processing capability. The data processing system 300 comprises an input 302 for receiving data from other devices or any inputting mechanism, the non-limiting examples of which include an external computer connected to the system, an Internet connection, or any computer readable medium 400 (illustrated in FIG. 4) such as a floppy disk, Compact Disk (CD), a Digital Versatile Disk/Digital Video Disk (DVD), and a removable hard drive. The input 302 may also be configured for receiving user input from another input device such as keyboard, a mouse, or any other input device best suited for the current environment conditions. Note that the input 302 may include multiple "ports" for receiving data and user input, and may also be configured to receive information from remote databases using wired or wireless connections. The output 304 is connected with the processor 306 for providing output to the user, possibly through a video display. Output 304 may also be provided to other devices or other programs, e.g. to other software modules, for use therein, possibly serving as a wired or wireless gateway to external databases or other processing devices or nodes. The input 302 and the output 304 are both coupled with a processor 306, which may be a general-purpose computer processor or a specialized processor designed specifically for use with the present invention. The processor 306 is coupled with a memory 308 to permit storage of data and software such as a data packet to be manipulated by commands to the processor.

(5) Discussion

To facilitate the discussion, the present invention provides nomenclatures for two types of normalization factors, the "incremental normalization factors" for the cases in which BPAs to be combined are normalized, and the "cumulative normalization factors" for cases in which the BPA to be combined are non-normalized. The "$k_{12}$" in Eq. (7) is an example of incremental normalization factor, whereas the k in Eq. (10) is an example of cumulative normalization factor.

By definition, the incremental normalization factor is only related to the combination of two BPAs, whereas the cumulative normalization factor encompasses the effect of combining two or more BPAs since the BPAs to be combined themselves can be the (non-normalized) result of combining two other BPAs in the first place, as long as the cumulative normalization factors are known. In this sense, the incremental normalization factor can be thought of as a special case of cumulative normalization factor in which the two combining BPAs happen to be normalized. In this special case, the incremental and cumulative normalization factors are equal.

The incremental and cumulative normalization factors also correspond to two types of conflicts in the D-S combination. An "incremental conflict" is defined as the conflict of combining two normalized BPAs. A "cumulative conflict," on the other hand, is the conflict resulting from combining two or more BPAs. For the examples presented earlier, the incremental conflict corresponding to $k_{12}$ is simply (according to Eq. (4)):

$$C_{12}=1-k_{12}. \quad (13)$$

Moreover, the cumulative conflict for k is $$C=1-k. \quad (14)$$

The Valuation-Based System (VBS) 500 illustrated in FIG. 5 is an exemplary methodology for solving uncertainty reasoning problems using uncertainty calculus, such as D-S belief function. In the VBS framework 500 implementing a D-S belief function calculus, a reasoning task is first represented as an undirected graph. The graph is then compiled into a tree structure called Markov Tree, which consists of current node(s), one or more neighbor node(s), along with bi-directional edges (or branches). FIG. 5 is an exemplary illustration of only a part of a larger Markov Tree 502, showing only two nodes, a current node 504 and a neighbor node 506 to the current node 504, along with bi-directional edges 508, 510, 512, and 514. The nodes 504 and 506 may represent variables and variable sets. Belief functions in BPA form reside in the nodes, and can be sent along the edges to their neighbors to be combined with other belief functions. A Markov Tree structure 502 and the associated belief propagation algorithm (described below) represent the reasoning algorithm in terms of belief function combinations. For example, if the reasoning task is to find the marginal belief of variable Y, given a set of belief functions distributed across the graph, the Markov Tree structure 502 specifies the exact sequence of belief combination operations the system must take in arriving at the marginal belief solution for Y. These steps are encoded in the Markov Tree structure 502 as a message-passing process, and follow a predefined belief propagation algorithm.

FIGS. 6A and 6B are exemplary flowchart diagrams illustrating the belief propagation algorithm for a Markov Tree 502 inside an exemplary VBS implementation. FIG. 6A illustrates the method for finding the marginal belief of a node, and FIG. 6B illustrates the method to send a message from a current node to its neighbor. Each node in the Markov Tree 502 initially has its own belief (also called initial BPA), and the goal is to find the marginal belief in one or more Markov nodes. As illustrated in FIG. 6A, to find the marginal belief of a node, the system, at operation 602, combines all BPA messages (simply called "messages") the node receives from its neighbors, and then at operation 604, combines the result with its own BPA. The result 606 is the marginal BPA for the node. To send a message from a current node 504 to its neighbor 506, as illustrated in FIG. 6B, the system, at operation 608, combines all messages it receives from all its neighbors, except 506, and its own BPA, and then at operation 610 sends the result to neighbor 506. Therefore, based on the exemplary algorithm outlined, initially only the leaf nodes in the Markov Tree 502 can send messages to their (only) neighbor, and then those receiving messages from the leaf nodes will be able to send messages to their neighbors; and so on. Therefore, the propagation of messages commences (as illustrated in FIG. 6B) with the leaf nodes forwarding messages to their neighbors, and those receiving the messages can then do the combination in accordance with the flow diagram of FIG. 6A. At the end of the propagation, all nodes within the Markov Tree should have their marginal beliefs. If a need exists to inject a new belief (or information) within the system, this new information is provided to a node within the Markov Tree, which introduces the changed or the added information. The actions that can change the initial belief of the variable node in the Markov Tree to incorporate the new input to the system are the SET and COMBINE operations, described below. The forwarding (FIG. 6B) and propagation (FIG. 6A) of a new message, introduced by either SET or COMBINE operations, is repeated to update all the nodes with the new marginal beliefs. This process is required because the change introduced by SET or COMBINE operation makes it necessary to recalculate the messages the node may have previously sent to its neighbors.

In a VBS implementation of the present invention, two operations (commands) are defined that can set off belief propagation after the initial belief propagation has finished. A "SET" operation is a command of the VBS implementation of the present invention that replaces the initial BPA at a node with a new input BPA, while a "COMBINE" operation is a command that replaces the initial BPA with the combination of the initial BPA and the new input BPA, allowing multiple independent beliefs to be accrued. The marginalization and extension operations may need to be carried out on BPA messages sent to neighbor nodes, which have a different variable frame than the node sending the message. Marginalization operation is defined as an operation in which a BPA represented on a joint variable frame is reduced to a BPA on a subset of variable frame by eliminating some of the variables in the original (joint) variable frame. The extension operation is the opposite of marginalization. That is, it is one in which a BPA represented on a joint variable frame is represented on a larger joint variable frame (incorporating additional variables). Nonetheless, these operations do not change the normalization status of a BPA, and therefore the computation of the conflict factor.

Figure 7:
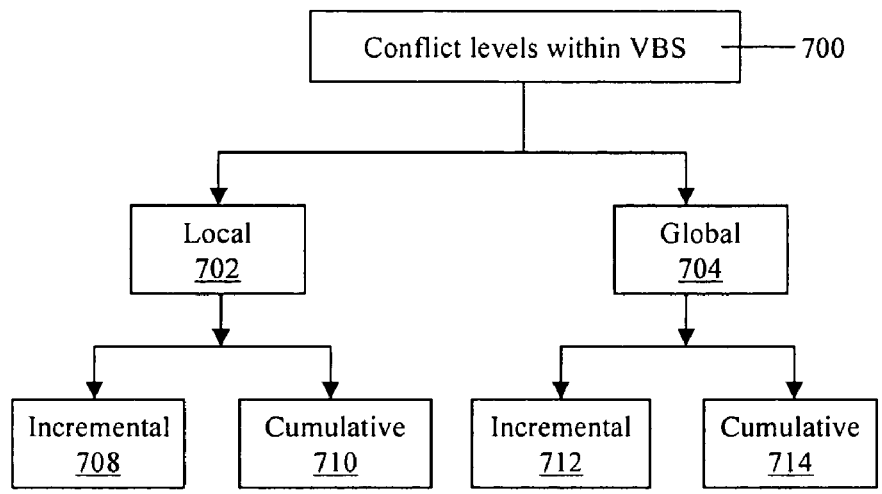
FIG. 7 is an exemplary diagram of various conflict measures within a Valuation Based System in accordance with the present invention.

Different types or levels of conflict can occur in the VBS inference system. Although the language describing them is often borrowed from the exemplary VBS implementation described in the present invention, the method developed should apply to all systems based on VBS theory. FIG. 7 is an exemplary diagram of various conflict levels 700 within a Valuation Based System in accordance with the present invention. As illustrated in FIG. 7, at least two levels of conflict exist in the VBS framework, a local conflict measure 702 and a global conflict measure 704. Within each level, a further distinction is made between incremental 708 and 712 and cumulative 710 and 714 conflicts. The local incremental conflict measure 708 provides information regarding the conflict that each new piece of information has with respect to that local input node. Each new piece of information is referred to as a belief or evidence. The local cumulative conflict measure 710 is the conflict that exists when all input beliefs up to a certain point combine. For example, when ten input beliefs have been combined at a node through the use of COMBINE command (at a local conflict 702 measure without considering the rest of the system), the local cumulative conflict measure 710 provides the information regarding the total conflict of all ten pieces of evidence (information or belief) combined together at that node. The local incremental conflict measure 708 considers one piece of input with the existing belief, where as the local cumulative conflict measure 710 considers all the pieces of evidence together at a node. The global incremental conflict measure 712 considers the influence of a single new input piece of belief on the system at a certain point. That is, it determines what the conflict is between this new piece of evidence and the system itself at a given point, including the local cumulative conflict measure 710. The global cumulative conflict measure 714 is similar to the local cumulative conflict measure 510. Global cumulative conflict measure 714 considers all pieces of evidence put together up to a certain point (i.e., it considers all inputs to the system on both the current or other nodes). These conflicts can be used to analyze the system in question in terms of conflict history over the course of the set of system inputs, or to monitor conflict measure changes from the beginning of the input sequence to the end of the input sequence, and to determine whether the conflict has something to do with any specific problems that require solving.

The local incremental conflict measure 708 is only defined in the context of a single variable frame for a plurality of belief functions defined on that variable frame, due to multiple "COMBINE" commands. The local incremental conflict 708 is defined as the conflict between any belief function in the set, and the combined, normalized belief function of the remaining belief functions. This conflict depends on the order in which the beliefs are combined. A natural order is based on the time of arrival of the beliefs. In this case the local incremental conflict is well defined, and the present invention considers all belief functions arriving prior to the chosen time as being in the set of original belief functions, and the next arrival as being the one belief function to be combined with. The combined BPA can be expressed as $$m^{(n)} = (1/k_n) m_n \otimes m^{(n-1)}, \quad (15)$$

where $m^{(n-1)}$ is the normalized, combined BPA from all BPAs prior to the arrival of the new BPA $m_n$, and $k_n$ is the incremental normalization factor ($m_n$ is normalized by default for an input BPA). It should be noted that superscripts such as (n) or (n−1) in Eq. (15) are standard mathematical notations for the (n)th or (n−1)th BPAs in time of occurrence, indicating that this equation is recursive. Therefore, the local incremental conflict measure 708 can now be defined as $$C_n = 1 - k_n. \quad (16)$$

The local cumulative conflict measure 710 is the conflict for a single variable, and is defined as the cumulative conflict of all belief functions received as input by the variable of concern, excluding those received from other variable nodes in the Markov Tree 502, such as the neighbor node 506. These beliefs are the result of multiple "COMBINE" commands. The local cumulative conflict measure 710 reflects the consistency of the evidence received at a specific variable node. Expanding the recursive equation (15) will facilitate defining the local cumulative conflict measure 710 mathematically:

$$m^{(n)} = (1/k_n) m_n \otimes [(1/k_{n-1}) m_{n-1} \otimes m^{(n-2)}]. \quad (17)$$

Continuing on with the expansion, for n=1, Eq. (17) becomes:

$$m^{(1)} = (1/k_1) m_1 \otimes m^{(0)}, \quad (18)$$

where $m^{(0)} = m_0$, which is the very first BPA assigned to the variable node (by default, both $m_0$ and $m_1$ are normalized), resulting in:

$$m^{(n)} = \left(1 / \prod_{i=1}^{n} k_i \right)\left[\bigotimes_{j=1}^{n} m_j\right]. \quad (19)$$

The expression inside the set of brackets "[ ]" in Eq. (19) is a short-hand notation for $(m_0 \otimes m_1 \otimes m_2 \otimes m_3 \ldots \otimes m_n)$. Therefore, the cumulative normalization factor is $$k^{(n)} = \prod_{i=1}^{n} k_i. \quad (20)$$

Accordingly, the cumulative conflict is $$C^{(n)} = 1 - k^{(n)} = 1 - \left(\prod_{i=1}^{n} k_i\right). \quad (21)$$

Since the cumulative normalization factor $k^{(n)}$ can be calculated easily at the end of combination (see Eq. (3)), the incremental normalization factor $k_n$ in Eq. (15) can be calculated through the following:

$$k_n = k^{(n)} / \prod_{i=1}^{n-1} k_i = k^{(n)} / k^{(n-1)}. \quad (22)$$

The global cumulative conflict measure 714 is the cumulative conflict from the combination of all the belief functions in the system. Since marginalization and extension operations do not change the normalization status of a BPA (therefore the conflict it represents), the global cumulative conflict measure 714 resulting from combining a set of BPAs is the same regardless of the order of combining. Therefore, global cumulative conflict measure 714 is the same everywhere at any node in the VBS system.

The marginal belief of any variable is the combination of all belief functions received at a variable, properly marginalized to the variable frame in question. Therefore, to determine the global cumulative conflict measure 714, the system can examine how a marginal belief is derived. Again, based on the belief propagation algorithm (of FIG. 6A), the marginal belief at a variable node is the combination of a) all the messages it receives from its neighbors; and b) the belief at the variable node itself. Part b) of the belief is simply the cumulated belief discussed above (in relation to Eqs. (15) and (19)). Assuming the combination of the messages from all neighbors to be $m_\delta$, and the associated (cumulative) normalization factor be $k_\delta$, the combined marginal BPA can be written as $$m_\Sigma = (1/k_{II,n}) [m^{(n)} \otimes (1/k_\delta) m_\delta], \quad (23)$$

where $k_{II,n}$ is the incremental normalization factor for the combination of $m^{(n)}$ and $m_\delta$. Since $m^{(n)}$ has $k^{(n)}$ as its cumulative normalization factor (Eq. 20), the cumulative normalization factor for $m_\Sigma$ is then $$k_\Sigma = k_{II,n} k^{(n)} k_\delta. \quad (24)$$

Hence the global cumulative conflict measure 714 is $$C_\Sigma = 1 - k_\Sigma.$$

The global incremental conflict measure 712 is the incremental conflict resulting from the introduction of a new BPA into the system. Two commands can be used to introduce new BPA into the system. If the command is "COMBINE," the new BPA, $m_{n+1}$, is combined with the initial BPA, i.e., the cumulative belief $m^{(n)}$, at the input variable, and the result is used to replace the initial BPA at the variable. If the command is "SET," however, the initial BPA at the variable will be discarded and replaced with the new $m_{n+1}$. The "COMBINE" command is described first since the "SET" is a special case for it.

Two types of incremental global normalization factor can be defined depending on the order the new input BPA is combined with the existing BPAs of the system. For the first type, when "COMBINE" is encountered, the marginal BPA at the node considering the new input BPA can be computed as:

$$m_{\Sigma+1} = (1/k_{I,n+1})\, m_{n+1} \otimes m_\Sigma, \tag{25}$$

where $k_{I,n+1}$ is the global incremental normalization factor due to $m_{n+1}$, which corresponds to the global incremental conflict measure 712. $k_{I,n+1}$ is defined as the "Type-I" global incremental normalization factor, and the corresponding conflict is Type-I global incremental conflict. Therefore, Type I global incremental normalization factor is the normalization factor considering a new incoming belief combined with the total combined belief of the entire system, as reflected at that variable (i.e., the input node).

A second type of global incremental normalization/conflict (Type II) comes from a different sequence with which $m_{\Sigma+1}$ can be computed, due to the associative property of D-S combination operation. The Type II global incremental normalization factor is the normalization factor considering the locally cumulative combined BPA at a node, including the new incoming BPA, combined with the combined messages from the rest of the system, as represented by the formula given in Eq. (23) (for n+1):

$$m_{\Sigma+1} = (1/k_{II,n+1})\, [m^{(n+1)} \otimes (1/k_\delta)\, m_\delta], \tag{26}$$

where $k_{II,n+1}$ is the incremental normalization factor defined as the "Type-II" incremental global normalization factor, and $$m^{(n+1)} = (1/k_{n+1})\, m_{n+1} \otimes m^{(n)}. \tag{27}$$

Note that $m^{(n+1)}$ has a cumulative normalization factor of $k^{(n+1)}$ (according to Eq. (20)). Assuming the cumulative normalization factor for $m_{\Sigma+1}$ to be $k_{\Sigma+1}$, then according to Eq. (26), $k_{\Sigma+1}$ can also be written as the following:

$$k_{\Sigma+1} = k_{II,n+1} k^{(n+1)} k_\delta, \tag{28}$$

from which $k_{II,n+1}$ can be computed:

$$k_{II,n+1} = k_{\Sigma+1}/(k^{(n+1)} k_\delta). \tag{29}$$

Now since the cumulative normalization factor for $m_{\Sigma+1}$, $k_{\Sigma+1}$ is known, the Type-I global incremental normalization factor (for $m_{n+1}$) can be computed as follows. From Eq. (25), the cumulative normalization factor for $m_{\Sigma+1}$ can also be written as:

$$k_{\Sigma+1} = k_{I,n+1} k_\Sigma, \tag{30}$$

assuming $m_{n+1}$ is normalized, where $k_\Sigma$ is the cumulative normalization factor for $m_\Sigma$ (Eq. (24)). Therefore, the result is:

$$k_{I,n+1} = k_{\Sigma+1}/k_\Sigma. \tag{31}$$

In other words, both types of incremental global normalization factors can be calculated using combination sequence outlined in Equations (26) and (27) without carrying out the combination operation defined in Eq. (25).

So far, two types of global incremental normalization factors have been described. One is generated by combining the new belief $m_{n+1}$ with the existing marginal belief $m_\Sigma$, as in Eq. (25) (Type-I), and the other is generated by combining the cumulated belief $m^{(n+1)}$ with the combined message $m_\delta$, as in Eq. (26) (Type-II). Both have their merits in performing conflict analysis, as the former considers all existing beliefs in the system as a whole when combined with the new belief, while the latter considers the combined belief from other pars of the system ($m_\delta$ does not include any belief from the current node) as a whole when combined with the cumulated input beliefs to the node in consideration. The conflict factors corresponding to these two incremental normalization factors are defined accordingly as follows:

$$C_{I,n+1} = 1 - k_{I,n+1} \tag{32}$$

and $$C_{II,n+1} = 1 - k_{II,n+1}. \tag{33}$$

A special case of the global incremental normalization can be defined for the case when a "SET" command is used to introduce the new belief $m_{n+1}$. In this case, since the cumulated belief $m^{(n)}$ will be replaced by $m_{n+1}$, the two types of global incremental normalization factors will be equal. Following Eq. (26) and replacing $m^{(n+1)}$ with $m_{n+1}$, results in:

$$m_{\Sigma+1} = (1/k_{II,n+1})\, [m_{n+1} \otimes (1/k_\delta) m_\delta]. \tag{34}$$

Therefore, the cumulative normalization factor becomes ($m_{n+1}$ is assumed to be normalized as are all input beliefs):

$$k_{\Sigma+1} = k_{II,n+1} k_\delta. \tag{35}$$

Therefore, the global incremental normalization factor can be computed from:

$$k_{II,n+1} = k_{\Sigma+1}/k_\delta. \tag{36}$$

On the other hand, if Eq. (25) is followed, since $m_\Sigma$ is the same as $m_\delta$ after removing $m^{(n)}$ (refer to Eq. (23)), the result will be:

$$m_{\Sigma+1} = (1/k_{I,n+1})\, m_{n+1} \otimes m_\Sigma = (1/k_{I,n+1})\, m_{n+1} \otimes (1/k_\delta) m_\delta. \tag{37}$$

Therefore, $$k_{\Sigma+1} = k_{I,n+1} k_\delta. \tag{38}$$

Comparing Equations (35) and (38), results in:

$$k_{I,n+1} = k_{II,n+1}. \tag{39}$$

This shows that Type-I and Type-II incremental global normalization factors are indeed the same.

(6) Results

Figure 8:
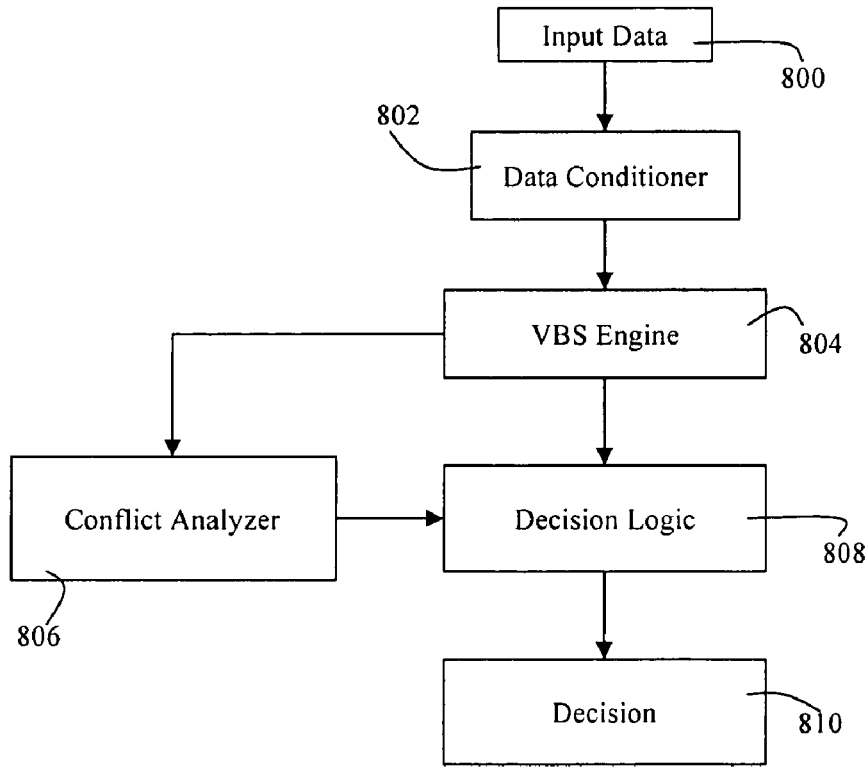
FIG. 8 is an exemplary flow diagram illustrating conflict monitoring applied in a reasoning decision support system.

Conflict monitoring can be applied in a reasoning or decision support system as illustrated in the exemplary flow diagram in FIG. 8. Input data (or information) 800 is first filtered or formatted by a data conditioner 802, then fed to a VBS engine 804 for reasoning. The conflict-monitoring scheme developed in this invention and implemented within the VBS engine 804 provides the conflict analyzer 806 a constant stream of conflict reports over time as the input data 800 are inputted. The decision logic 808 finally uses both the VBS engine 804 results and the results from the conflict analyzer 806 to reach the appropriate decision 810.

Although the invention has been described in language specific to structural features and or methodological operations (or acts), it is to be understood that the invention defined in the appended claims is not necessarily limited to the specific features or operations described. Rather, the specific features and operations are disclosed as exemplary forms for implementing the claimed invention. Accordingly, while exemplary illustrative embodiments of the invention have been described, numerous variations and alternative embodiments will occur to those skilled in the art. For example, one can use the present invention to analyze the conflict in beliefs represented in different parts of the system in general. Specifically, one can analyze the belief conflicts between two parts of a system separated by a single edge 508, as illustrated in FIG. 5. Such variations and alternate embodiments are contemplated, and can be made without departing from the spirit and scope of the invention.

What is claimed is:

1. A method for determining valuation-based system characteristics of a physical system represented as a set of basic probability assignments (BPAs), the method comprising acts, performed on a data processing system, of:
receiving a sequence of normalized basic probability assignments (BPAs) designated $m_i$, for index $i=1, \ldots, n$; having intermediate combined, unnormalized BPAs designated $m'^{(n)}$;
determining a valuation-based system characteristic selected from a group consisting of
a local cumulative normalization factor,
a local incremental normalization factor,
a local cumulative conflict measure,
a local incremental conflict measure,
a global cumulative normalization factor,
a Type I global incremental normalization factor,
a Type II global incremental normalization factor,
a global cumulative conflict measure,
a Type I global incremental conflict measure, and
a Type II global incremental conflict measure
determined from:

$k_{12}=k/(k_1 k_2)$, where
$k_1$ is a normalization factor for a first BPA $m_1$,
$k_2$ is a normalization factor for a second BPA $m_2$,
k is an overall normalization factor, and
$k_{12}$ represents an incremental normalization factor;
outputting the valuation-based system characteristic; whereby the valuation-based system characteristic provides information for evaluating the physical system.

2. A method as set forth in claim 1, where the valuation-based system characteristic determined is a local cumulative normalization factor, determined from:

$$k^{(n)} = \sum_{\forall A \subseteq \Theta} m'^{(n)}(A),$$

where:
$k^{(n)}$ denotes the local cumulative normalization factor, cumulative to a current BPA $m_n$;
$m'^{(n)}$ denotes an non-normalized, combined BPA, and is represented by a recursive relation $m'^{(n)}=m'^{(n-1)} \otimes m_n$, having an initial condition $m'^{(0)}=m_0$, where $m_0$ is a normalized BPA initially residing in a node under consideration; and A denotes a subset of $\Theta$, where $\Theta$ represents a collection of exclusive and collectively exhaustive outcomes of states of the physical system represented by a node under consideration for the valuation-based system.

3. A method as set forth in claim 2, wherein the valuation-based system characteristic is a local cumulative conflict measure, determined from:

$C^{(n)}=1-k^{(n)}$, where:
$C^{(n)}$ denotes the local cumulative conflict measure, cumulative to a current BPA $m_n$; and
$k^{(n)}$ denotes the local cumulative normalization factor, cumulative to a current BPA $m_n$.

4. A method as set forth in claim 2, where the valuation-based system is represented by a Markov Tree, and wherein the valuation-based system characteristic is a global cumulative normalization factor, determined from:

$$k_\Sigma = \sum_{\forall A \subseteq \Theta} m'_\Sigma(A);$$

where
$k_\Sigma$ denotes the global cumulative normalization factor;
$m'_\Sigma$ denotes an non-normalized, combined BPA, and is equal to $m'^{(n)} \otimes m_\delta$, and $m_\delta$ represents a combination of messages from all neighboring nodes; and
A denotes a subset of $\Theta$, where $\Theta$ represents a collection of exclusive and collectively exhaustive outcomes of states of the physical system represented by a node under consideration for the valuation-based system.

5. A method as set forth in claim 1, where the valuation-based system characteristic determined is a local incremental normalization factor, determined from:

$k_n = k^{(n)}/k^{(n-1)}$, where:
$k_n$ denotes the local incremental normalization factor;
$k^{(n)}$ denotes the local cumulative normalization factor, cumulative to a current BPA $m_n$; and
$k^{(n-1)}$ denotes a local cumulative normalization factor, cumulative to a previous BPA $m_{n-1}$.

6. A method as set forth in claim 5, wherein the valuation-based system characteristic is a local incremental conflict measure, determined from:

$C_n=1-k_n$;

where:
$C_n$ denotes the local incremental conflict measure; and
$k_n$ denotes the local incremental normalization factor.

7. A method as set forth in claim 1, wherein the valuation-based system characteristic is a local cumulative conflict measure, determined from:

$C^{(n)}=1-k^{(n)}$, where:
$C^{(n)}$ denotes the local cumulative conflict measure, cumulative to a current BPA $m_n$; and
$k^{(n)}$ denotes the local cumulative normalization factor, cumulative to a current BPA $m_n$.

8. A method as set forth in claim 1, wherein the valuation-based system characteristic is a local incremental conflict measure, determined from:

$C_n=1-k_n$;

where:

$C_n$ denotes the local incremental conflict measure; and $k_n$ denotes the local incremental normalization factor.

9. A method as set forth in claim 1, where the valuation-based system is represented by a Markov Tree, and wherein the valuation-based system characteristic is a global cumulative normalization factor, determined from:

$$k_\Sigma = \sum_{\forall A \subseteq \Theta} m'_\Sigma(A);$$

where $k_\Sigma$ denotes the global cumulative normalization factor;

$m'_\Sigma$ denotes an unnormalized, combined BPA, and is equal to $m'^{(n)} \otimes m_\delta$, and $m_\delta$ represents the combination of messages from all neighboring nodes; and A denotes a subset of $\Theta$, where $\Theta$ represents a collection of exclusive and collectively exhaustive outcomes of states of the physical system represented by a node under consideration for the valuation-based system.

10. A method as set forth in claim 9, where the valuation-based system characteristic is a Type I global incremental normalization factor, determined from:

$k_{I,n} = k_\Sigma / k_{\Sigma-1};$ where $k_{I,n}$ denotes the Type I global incremental normalization factor; and $k_\Sigma$ and $k_{\Sigma-1}$ are the global cumulative normalization factors for a current BPA ($m_n$) and a previous BPA ($m_{n-1}$).

11. A method as set forth in claim 9, where the valuation-based system characteristic is a Type II global incremental normalization factor, determined from:

$k_{II,n} = k_\Sigma / (k^{(n)} k_\delta);$ where $k_{II,n}$ denotes the Type II global incremental normalization factor;

$k_\Sigma$ denotes the global cumulative normalization factors for the current input BPA ($m_n$);

$k^{(n)}$ denotes the local cumulative normalization factor, cumulative to a current BPA $m_n$; and $k_\delta$ denotes the cumulative normalization factor for $m_\delta$, which is a combined BPA of all messages from neighboring nodes.

12. A method as set forth in claim 1, where the valuation-based system characteristic is a Type I global incremental normalization factor, determined from:

$k_{I,n} = k_\Sigma / k_{\Sigma-1};$ where $k_{I,n}$ denotes the Type I global incremental normalization factor; and $k_\Sigma$ and $k_{\Sigma-1}$ are the global cumulative normalization factors for the current input BPA ($m_n$) and the previous input BPA ($m_{n-1}$).

13. A method as set forth in claim 12, where the valuation-based system characteristic is a global cumulative conflict measure, determined from:

$C_\Sigma = 1 - k_\Sigma;$ where:

$C_\Sigma$ denotes the global cumulative conflict measure; and $k_\Sigma$ denotes the global cumulative normalization factor.

14. A method as set forth in claim 12, where the valuation-based system characteristic is a Type I global incremental conflict measure, determined from:

$C_{I,n} = 1 - k_{I,n};$ where $C_{I,n}$ denotes the Type I global incremental conflict measure;

$k_{I,n}$ denotes the Type I global incremental normalization factor.

15. A method as set forth in claim 1, where the valuation-based system characteristic is a Type II global incremental normalization factor, determined from:

$k_{II,n} = k_\Sigma / (k^{(n)} k_\delta);$ where $k_{II,n}$ denotes the Type II global incremental normalization factor;

$k_\Sigma$ denotes the global cumulative normalization factors for the current input BPA ($m_n$);

$k^{(n)}$ denotes the local cumulative normalization factor, cumulative to a current BPA $m_n$; and $k_\delta$ denotes the cumulative normalization factor for $m_\delta$, which is the combined BPA of all messages from neighboring nodes.

16. A method as set forth in claim 15, where the valuation-based system characteristic is a Type II global incremental conflict measure, determined from:

$C_{II,n} = 1 - k_{II,n};$ where $C_{II,n}$ denotes the Type II global incremental conflict measure; and $k_{II,n}$ denotes the Type II global incremental normalization factor.

17. A method as set forth in claim 1, where the valuation-based system characteristic is a global cumulative conflict measure, determined from the relationship:

$C_\Sigma = 1 - k_\Sigma;$ where:

$C_\Sigma$ denotes the global cumulative conflict measure; and $k_\Sigma$ denotes the global cumulative normalization factor.

18. A method as set forth in claim 1, where the valuation-based system characteristic is a Type I global incremental conflict measure, determined from the relationship:

$C_{I,n} = 1 - k_{I,n};$ where $C_{I,n}$ denotes the Type I global incremental conflict measure; and $k_{I,n}$ denotes the Type I global incremental normalization factor.

19. A method as set forth in claim 1, where the valuation-based system characteristic is a Type II global incremental conflict measure, determined from the relationship:

$C_{II,n} = 1 - k_{II,n};$ where $C_{II,n}$ denotes the Type II global incremental conflict measure; and $k_{II,n}$ denotes the Type II global incremental normalization factor.

20. A computer program product for determining valuation-based system characteristics of a physical system represented as a set of basic probability assignments (BPAs) on a data processing system, the computer program product comprising a computer-readable medium having computer program instructions stored therein for causing a computer to perform operations of:

receiving a sequence of normalized basic probability assignments (BPAs) designated $m_i$, for index i=1, ..., n;

having intermediate combined, unnormalized BPAs designated $m'^{(n)}$;

determining a valuation-based system characteristic selected from a group consisting of
a local cumulative normalization factor,
a local incremental normalization factor,
a local cumulative conflict measure,
a local incremental conflict measure,
a global cumulative normalization factor,
a Type I global incremental normalization factor,
a Type II global incremental normalization factor,
a global cumulative conflict measure,
a Type I global incremental conflict measure, and
a Type II global incremental conflict measure
determined from:

$$k_{12}=k/(k_1 k_2),$$

where
$k_1$ is a normalization factor for a first BPA $m_1$,
$k_2$ is a normalization factor for a second BPA $m_2$,
k is an overall normalization factor, and
$k_{12}$ represents an incremental normalization factor;

outputting the valuation-based system characteristic; whereby the valuation-based system characteristic provides information for evaluating the physical system.

21. The computer program product as set forth in claim 20, where the valuation-based system characteristic determined is a local cumulative normalization factor, determined from:

$$k^{(n)} = \sum_{\forall A \subseteq \Theta} m'^{(n)}(A),$$

where:
$k^{(n)}$ denotes the local cumulative normalization factor, cumulative to a current BPA $m_n$;
$m'^{(n)}$ denotes an non-normalized, combined BPA, and is represented by a recursive relation $m'^{(n)}=m'^{(n-1)}\otimes m_n$, having an initial condition $m'^{(0)}=m_0$, where $m_0$ is a normalized BPA initially residing in a node under consideration; and
A denotes a subset of $\Theta$, where $\Theta$ represents a collection of exclusive and collectively exhaustive outcomes of states of the physical system represented by a node under consideration for the valuation-based system.

22. The computer program product as set forth in claim 21, wherein the valuation-based system characteristic is a local cumulative conflict measure, determined from:

$$C^{(n)}=1-k^{(n)},$$

where:
$C^{(n)}$ denotes the local cumulative conflict measure, cumulative to a current BPA $m_n$; and
$k^{(n)}$ denotes the local cumulative normalization factor, cumulative to a current BPA $m_n$.

23. The computer program product as set forth in claim 21, where the valuation-based system is represented by a Markov Tree, and wherein the valuation-based system characteristic is a global cumulative normalization factor, determined from:

$$k_\Sigma = \sum_{\forall A \subseteq \Theta} m'_\Sigma(A);$$

where
$k_\Sigma$ denotes the global cumulative normalization factor;
$m'_\Sigma$ denotes an non-normalized, combined BPA, and is equal to $m'^{(n)} \otimes m_\delta$, and $m_\delta$ represents a combination of messages from all neighboring nodes; and
A denotes a subset of $\Theta$, where $\Theta$ represents a collection of exclusive and collectively exhaustive outcomes of states of the physical system represented by a node under consideration for the valuation-based system.

24. The computer program product as set forth in claim 20, where the valuation-based system characteristic determined is a local incremental normalization factor, determined from:

$$k_n = k^{(n)}/k^{(n-1)},$$

where:
$k_n$ denotes the local incremental normalization factor;
$k^{(n)}$ denotes the local cumulative normalization factor, cumulative to a current BPA $m_n$; and
$k^{(n-1)}$ denotes a local cumulative normalization factor, cumulative to a previous BPA $m_{n-1}$.

25. The computer program product as set forth in claim 24, wherein the valuation-based system characteristic is a local incremental conflict measure, determined from:

$$C_n=1-k_n;$$

where:
$C_n$ denotes the local incremental conflict measure; and
$k_n$ denotes the local incremental normalization factor.

26. The computer program product as set forth in claim 20, wherein the valuation-based system characteristic is a local cumulative conflict measure, determined from:

$$C^{(n)}=1-k^{(n)},$$

where:
$C^{(n)}$ denotes the local cumulative conflict measure, cumulative to a current BPA $m_n$; and
$k^{(n)}$ denotes the local cumulative normalization factor, cumulative to a current BPA $m_n$.

27. The computer program product as set forth in claim 20, wherein the valuation-based system characteristic is a local incremental conflict measure, determined from:

$$C_n=1-k_n;$$

where:
$C_n$ denotes the local incremental conflict measure; and
$k_n$ denotes the local incremental normalization factor.

28. The computer program product as set forth in claim 20, where the valuation-based system is represented by a Markov Tree, and wherein the valuation-based system characteristic is a global cumulative normalization factor, determined from:

$$k_\Sigma = \sum_{\forall A \subseteq \Theta} m'_\Sigma(A);$$

where
$k_\Sigma$ denotes the global cumulative normalization factor;
$m'_\Sigma$ denotes an unnormalized, combined BPA, and is equal to $m'^{(n)} \otimes m_\delta$, and $m_\delta$ represents the combination of messages from all neighboring nodes; and A denotes a subset of $\Theta$, where $\Theta$ represents a collection of exclusive and collectively exhaustive outcomes of states of the physical system represented by a node under consideration for the valuation-based system.

29. The computer program product as set forth in claim 28, where the valuation-based system characteristic is a Type I global incremental normalization factor, determined from:

$$k_{I,n}=k_\Sigma/k_{\Sigma-1};$$

where
- $k_{I,n}$ denotes the Type I global incremental normalization factor; and
- $k_\Sigma$ and $k_{\Sigma-1}$ are the global cumulative normalization factors for a current BPA ($m_n$) and a previous BPA ($m_{n-1}$).

30. The computer program product as set forth in claim 28, where the valuation-based system characteristic is a Type II global incremental normalization factor, determined from:

$$k_{II,n}=k_\Sigma/(k^{(n)}k_\delta);$$

where
- $k_{II,n}$ denotes the Type II global incremental normalization factor;
- $k_\Sigma$ denotes the global cumulative normalization factors for the current input BPA ($m_n$);
- $k^{(n)}$ denotes the local cumulative normalization factor, cumulative to a current BPA $m_n$; and
- $k_\delta$ denotes the cumulative normalization factor for $m_\delta$, which is a combined BPA of all messages from neighboring nodes.

31. The computer program product as set forth in claim 20, where the valuation-based system characteristic is a Type I global incremental normalization factor, determined from:

$$k_{I,n}=k_\Sigma/k_{\Sigma-1};$$

where
- $k_{I,n}$ denotes the Type I global incremental normalization factor; and
- $k_\Sigma$ and $k_{\Sigma-1}$ are the global cumulative normalization factors for the current input BPA ($m_n$) and the previous input BPA ($m_{n-1}$).

32. The computer program product as set forth in claim 31, where the valuation-based system characteristic is a global cumulative conflict measure, determined from:

$$C_\Sigma=1-k_\Sigma;$$

where:
- $C_\Sigma$ denotes the global cumulative conflict measure; and
- $k_\Sigma$ denotes the global cumulative normalization factor.

33. The computer program product as set forth in claim 31, where the valuation-based system characteristic is a Type I global incremental conflict measure, determined from:

$$C_{I,n}=1-k_{I,n};$$

where
- $C_{I,n}$ denotes the Type I global incremental conflict measure;
- $k_{I,n}$ denotes the Type I global incremental normalization factor.

34. The computer program product as set forth in claim 20, where the valuation-based system characteristic is a Type II global incremental normalization factor, determined from:

$$k_{II,n}=k_\Sigma/(k^{(n)}k_\delta);$$

where
- $k_{II,n}$ denotes the Type II global incremental normalization factor;
- $k_\Sigma$ denotes the global cumulative normalization factors for the current input BPA ($m_n$);
- $k^{(n)}$ denotes the local cumulative normalization factor, cumulative to a current BPA $m_n$; and
- $k_\delta$ denotes the cumulative normalization factor for $m_\delta$, which is the combined BPA of all messages from neighboring nodes.

35. The computer program product as set forth in claim 34, where the valuation-based system characteristic is a Type II global incremental conflict measure, determined from:

$$C_{II,n}=1-k_{II,n};$$

where
- $C_{II,n}$ denotes the Type II global incremental conflict measure; and
- $k_{II,n}$ denotes the Type II global incremental normalization factor.

36. The computer program product as set forth in claim 20, where the valuation-based system characteristic is a global cumulative conflict measure, determined from the relationship:

$$C_\Sigma=1-k_\Sigma;$$

where:
- $C_\Sigma$ denotes the global cumulative conflict measure; and
- $k_\Sigma$ denotes the global cumulative normalization factor.

37. The computer program product as set forth in claim 20, where the valuation-based system characteristic is a Type I global incremental conflict measure, determined from the relationship:

$$C_{I,n}=1-k_{I,n};$$

where
- $C_{I,n}$ denotes the Type I global incremental conflict measure; and
- $k_{I,n}$ denotes the Type I global incremental normalization factor.

38. The computer program product as set forth in claim 20, where the valuation-based system characteristic is a Type II global incremental conflict measure, determined from the relationship:

$$C_{II,n}=1-k_{II,n};$$

where
- $C_{II,n}$ denotes the Type II global incremental conflict measure; and
- $k_{II,n}$ denotes the Type II global incremental normalization factor.

* * * * *